United States Patent
O'Meara

(10) Patent No.: US 12,180,702 B2
(45) Date of Patent: Dec. 31, 2024

(54) FIRE-RESISTANT COMPOSITE STRUCTURAL BUILDING PANELS

(71) Applicant: ROM Development Corp., Bristol, RI (US)

(72) Inventor: Richard O'Meara, Bristol, RI (US)

(73) Assignee: ROM Development Corp., Bristol, RI (US)

( * ) Notice: Subject to any disclaimer, the term of this patent is extended or adjusted under 35 U.S.C. 154(b) by 387 days.

(21) Appl. No.: 17/517,377

(22) Filed: Nov. 2, 2021

(65) Prior Publication Data

US 2022/0136236 A1    May 5, 2022

Related U.S. Application Data

(60) Provisional application No. 63/109,522, filed on Nov. 4, 2020.

(51) Int. Cl.
*E04B 1/94* (2006.01)
*B32B 3/06* (2006.01)
(Continued)

(52) U.S. Cl.
CPC .............. *E04B 1/942* (2013.01); *B32B 3/06* (2013.01); *B32B 5/024* (2013.01); *B32B 5/18* (2013.01); *B32B 5/245* (2013.01); *B32B 9/02* (2013.01); *B32B 9/046* (2013.01); *B32B 13/14* (2013.01); *E04B 1/6116* (2013.01); *B32B 2255/02* (2013.01); *B32B 2255/26* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2266/0264* (2013.01); *B32B 2307/304* (2013.01); *B32B 2307/3065* (2013.01);
(Continued)

(58) Field of Classification Search
CPC .... E04B 1/942; E04B 1/6116; E04B 2103/02; B32B 3/06; B32B 5/024; B32B 5/18; B32B 5/245; B32B 9/02; B32B 9/046; B32B 13/14; B32B 2255/02; B32B 2255/26; B32B 2260/021; B32B 2260/046; B32B 2262/0269; B32B 2262/101; B32B 2262/106; B32B 2266/0264; B32B 2307/304; B32B 2307/3065; B32B 2419/00; E04C 2/288; E04C 2002/004
See application file for complete search history.

(56) References Cited

U.S. PATENT DOCUMENTS

| | | | | |
|---|---|---|---|---|
| 4,198,454 A | * | 4/1980 | Norton | F41H 5/0464 428/117 |
| 4,833,855 A | * | 5/1989 | Winter, IV | E04C 2/288 52/591.4 |

(Continued)

*Primary Examiner* — Brent W Herring
(74) *Attorney, Agent, or Firm* — Hinckley Allen & Snyder; Stephen Holmes

(57) ABSTRACT

A composite skinned panel is disclosed which uses, in some embodiments, a combination of cementitious, insulative and ablative core materials to provide a building panel which can effectively meet a variety of different commercial, residential and marine fire codes. For example, one such fire test is an A60 fire rating (International Marine Organization (IMO) A60 Class A Bulkhead), which establishes that the panel provide 60 minutes of protection from a front side temperature of 1750° F. without raising the internal temperature more than 250° F.

19 Claims, 6 Drawing Sheets

(51) Int. Cl.
  *B32B 5/02*    (2006.01)
  *B32B 5/18*    (2006.01)
  *B32B 5/24*    (2006.01)
  *B32B 9/02*    (2006.01)
  *B32B 9/04*    (2006.01)
  *B32B 13/14*   (2006.01)
  *E04B 1/61*    (2006.01)
  *E04C 2/00*    (2006.01)
  *E04C 2/288*   (2006.01)

(52) U.S. Cl.
  CPC ....... *B32B 2419/00* (2013.01); *E04B 2103/02* (2013.01); *E04C 2002/004* (2013.01); *E04C 2/288* (2013.01)

(56) References Cited

U.S. PATENT DOCUMENTS

| | | | | |
|---|---|---|---|---|
| 5,942,321 | A * | 8/1999 | Romesberg | B60R 13/0225 |
| | | | | 428/317.1 |
| 7,897,235 | B1 * | 3/2011 | Locher | E04C 2/525 |
| | | | | 52/309.4 |
| 8,074,766 | B1 * | 12/2011 | Shore | E04B 1/86 |
| | | | | 181/290 |
| 8,728,603 | B2 * | 5/2014 | Windmoller | E04F 15/10 |
| | | | | 52/592.4 |
| 11,852,443 | B2 * | 12/2023 | Harris | B32B 7/12 |
| 2003/0162461 | A1 * | 8/2003 | Balthes | D04H 1/425 |
| | | | | 442/411 |
| 2004/0177590 | A1 * | 9/2004 | Nudo | B32B 3/12 |
| | | | | 428/116 |
| 2006/0178064 | A1 * | 8/2006 | Balthes | B29C 43/003 |
| | | | | 427/532 |
| 2007/0116991 | A1 * | 5/2007 | Balthes | B32B 27/302 |
| | | | | 428/920 |
| 2009/0183457 | A1 * | 7/2009 | Boucke | B32B 21/042 |
| | | | | 52/425 |
| 2011/0173911 | A1 * | 7/2011 | Propst | B32B 13/045 |
| | | | | 427/403 |
| 2011/0296780 | A1 * | 12/2011 | Windmoller | B32B 27/304 |
| | | | | 156/182 |
| 2013/0318908 | A1 * | 12/2013 | Holley | E04C 2/296 |
| | | | | 428/313.9 |
| 2015/0175801 | A1 * | 6/2015 | Kim | B32B 27/20 |
| | | | | 428/416 |
| 2016/0369507 | A1 * | 12/2016 | Pervan | B32B 38/08 |
| 2018/0044925 | A1 * | 2/2018 | Koh | B29C 48/0012 |
| 2019/0292793 | A1 * | 9/2019 | Van Vlassenrode | B32B 27/40 |
| 2021/0114344 | A1 * | 4/2021 | Van Vlassenrode | B32B 5/18 |
| 2021/0172710 | A1 * | 6/2021 | Harris | B32B 7/12 |
| 2021/0172711 | A1 * | 6/2021 | Harris | F41H 5/0471 |
| 2021/0237397 | A1 * | 8/2021 | Van Vlassenrode | B32B 27/08 |
| 2022/0120096 | A1 * | 4/2022 | Schacht | C04B 28/32 |
| 2023/0010679 | A1 * | 1/2023 | Van Vlassenrode | B32B 27/365 |
| 2023/0330980 | A1 * | 10/2023 | Drevet | B32B 29/06 |

\* cited by examiner

FIRE-RESISTANT COMPOSITE STRUCTURAL BUILDING PANELS

CROSS-REFERENCE TO RELATED APPLICATIONS

This application is related to and claims priority from earlier filed U.S. Provisional Patent Application No. 63/109,522, filed Nov. 4, 2020.

BACKGROUND OF THE DISCLOSURE

The present disclosure generally relates to fire resistant building materials. More specifically, the present disclosure provides fire resistant structural building panels which are constructed from composite laminated materials.

Composite building panels are known in the art. Composite materials are light in weight and, per pound, stronger than other conventional construction techniques using steel, gypsum and concrete. The use of fiber reinforcement layers allow a panel to carry significant load while resins distribute load throughout the reinforced structure. The resin also offers weather and UV protection to the reinforcements. By combining specific, resins, fibers and other materials custom panels can be developed to meet almost any specific strength requirement. A majority of the composite building panels known to the general public are decorative or insulative panels used in niche building scenarios. While structurally superior and lighter in weight than traditional building and insulting materials, these panels still have drawbacks.

A major drawback to the widespread adoption of fiber/resin composite structural panels is an inability to meet certain building fire codes and standardized fire rating tests. Cementitious and gypsum materials, such as gypsum wall board fair better in fire rating tests, but drastically increase weight of the structure when used exclusively. As a result, neither of these technologies provide a universally acceptable solution.

In addition to obvious uses in fixed conventional building structures, fire-resistant composite building materials are even more critical in military applications, marine vehicles and emergency shelter structures, which all must be structurally stable, lightweight, and fire-resistant when subjected to a variety of adverse conditions. To date, the prior art has not been able provide a composite building panel which meets all the fire resistance criteria.

Therefore, it is an object of the present disclosure to provide a novel composite structural panel solution that is structurally stable, lightweight and meets fire-resistance standards.

SUMMARY OF THE INVENTION

The present disclosure describes a unique composite skinned panel which uses, in some embodiments, a combination of cementitious, insulative and ablative core materials to provide a building panel which can effectively meet a variety of different commercial, residential and marine fire codes. For example, one such fire test is an A60 fire rating (International Marine Organization (IMO) A60 Class A Bulkhead), which establishes that the panel provide 60 minutes of protection from a front side temperature of 1750° F. without raising the internal temperature more than 250° F.

In a first exemplary embodiment, an asymmetrical fire-resistant skinned panel in accordance with the disclosure comprises a reinforced cementitious innermost core layer with a fiber reinforced resin skin on opposing surfaces thereof. On the fire-resistant side, a layer of insulative material is adhered to a cementitious core, and a further layer of an ablative material is adhered onto the insulative core. A fiber reinforcement layer (skin) is applied over the ablative core layer and thereafter an intumescent coating layer is applied to the skin. Additional decorative primers and coatings, such as paint, can be externally applied to the fiber reinforcement layer. On the opposing insulating side, an insulative core material is adhered to the opposing side of the cementitious core. A fiber reinforcement layer (skin) is applied over the insulative core layer and thereafter an intumescent coating layer is applied. Additional decorative primers and coatings, such as paints, can be externally applied to the fiber reinforcement layer.

In a second exemplary embodiment, a symmetrical, fire-resistant panel is symmetrically layered in construction and comprises a reinforced cementitious innermost core layer having a fiber reinforced resin skin on opposing surfaces thereof. Both sides of the present panel provide fire resistance. A layer of insulative core material is adhered to both sides of the cementitious core, and a further layer of an ablative core material is adhered to the now opposing insulative core layers. Fiber reinforcement layers (skins) are applied over the ablative core layers and thereafter intumescent coating layers are applied over the fiber reinforcement layers. Additional decorative primers and coatings, such as paints, can be externally applied to the fiber reinforcement layers.

The panel assembled in this manner is highly structurally stable providing 4 spaced fiber reinforcement layers, 2 internal layers provided on the innermost cementitious core and two external layers on the outer surfaces.

In a fire test, exposing the fire-resistant side of the panel to a 1750° F. fire source, the facing intumescent coating, fiber reinforcement skin, ablative core and insulative core progressively ablate over the 60-minute time period and prevent the surface temperature of the cementitious core from rising above the testing threshold.

Additional embodiments of the invention provide the panels with exemplary joint configurations to allow interlocking of the panels along walls, corners, floors and ceilings. Joint configurations may be strengthened with additional reinforcement elements, such as structural splines, materials with higher core densities, other core materials, bolts and fasteners to withstand local loading.

BRIEF DESCRIPTION OF THE DRAWINGS

In the drawings which illustrate the best mode presently contemplated for carrying out the present invention.

DETAILED DESCRIPTION OF THE INVENTION

Figure 1:
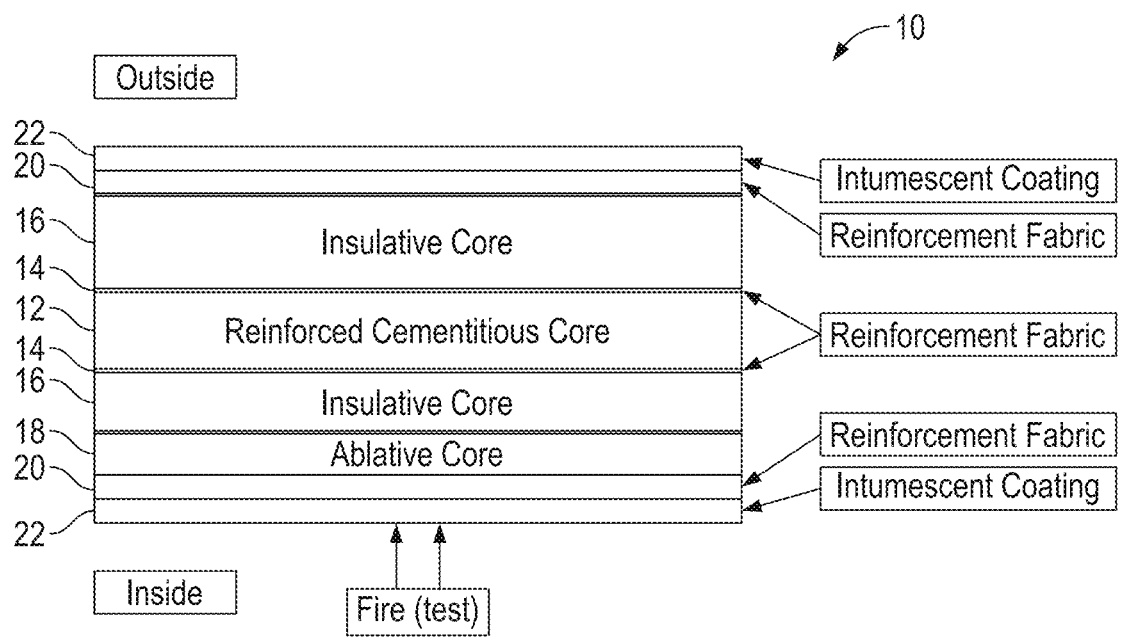
FIG. 1 is a cross-section of an exemplary embodiment of an asymmetrical reinforced panel.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

The present disclosure describes a unique composite skinned panel which uses a combination of cementitious, insulative and ablative core materials to achieve a fire-resistant panel.

Generally, the fire-resistant panel construction of the present disclosure employs a theory of progressive ablation of multiple different material layers which also impart provide superior strength and rigidity as well as finished surface. Ablation is removal or destruction of material from an object by an erosive process, such as fire. In the context of the present disclosure, this means materials that are sacrificial and become "spent" over time as they are exposed to heat or fire. Given sufficient time under fire or heat conditions, these products char away, crumble, and disappear.

Similarly, intumescent materials as disclosed herein is a layer of protective material which works by chemical reaction generated by heat, resulting in swelling and formation of an insulating layer on the surface, with or without release of water. An intumescent material increases in volume and reduces in density when exposed to heat. It is a passive fire retardant and fire protector which is able to insulate coated surfaces from further thermal attack.

The operative principal is to layer a sufficient variety and thickness of ablative and intumescent material in the way of the fire that a desired level of fire-resistance rating can be maintained, as demonstrated in a fire test. Ablative materials may in some cases have a large concentration of organic matter that is reduced by fire to ashes. Additionally, as core materials are depleted within the structure, removal creates air voids within the structure further creating an insulative air gap across which heat must pass.

In a first exemplary embodiment, as illustrated in FIG. 1, an asymmetrical fire-resistant skinned panel 10 in accordance with the disclosure comprises an innermost core layer 12 preferably formed from a reinforced cementitious material. A fiber reinforced resin skin 14 is applied to opposing surfaces of the core layer 12. On the fire-resistant side, indicated as inside or fire, a layer of insulative core material 16 is adhered to the resin skin 14, and a further layer of an ablative core 18 material is adhered to the insulative core 16. An outer fiber reinforcement layer 20 is applied over the ablative core layer 18 and thereafter an intumescent coating layer 22 is applied over the outer fiber reinforcement 20. Additionally, decorative primers and coatings, such as paints, can be externally applied to the outer fiber reinforcement layer 20 and/or intumescent coating 22.

On the opposing insulating side, indicated as outside, an insulative core material 16 is adhered to the resin skin 14 on the opposing side of the cementitious core 12. An outer fiber reinforcement layer 22 is applied over the insulative core layer 16 and thereafter an intumescent coating layer 22. Additionally, decorative primers and coatings, such as paints, can be externally applied to the outer fiber reinforcement layer 20 and/or intumescent coating 22.

Figure 2:
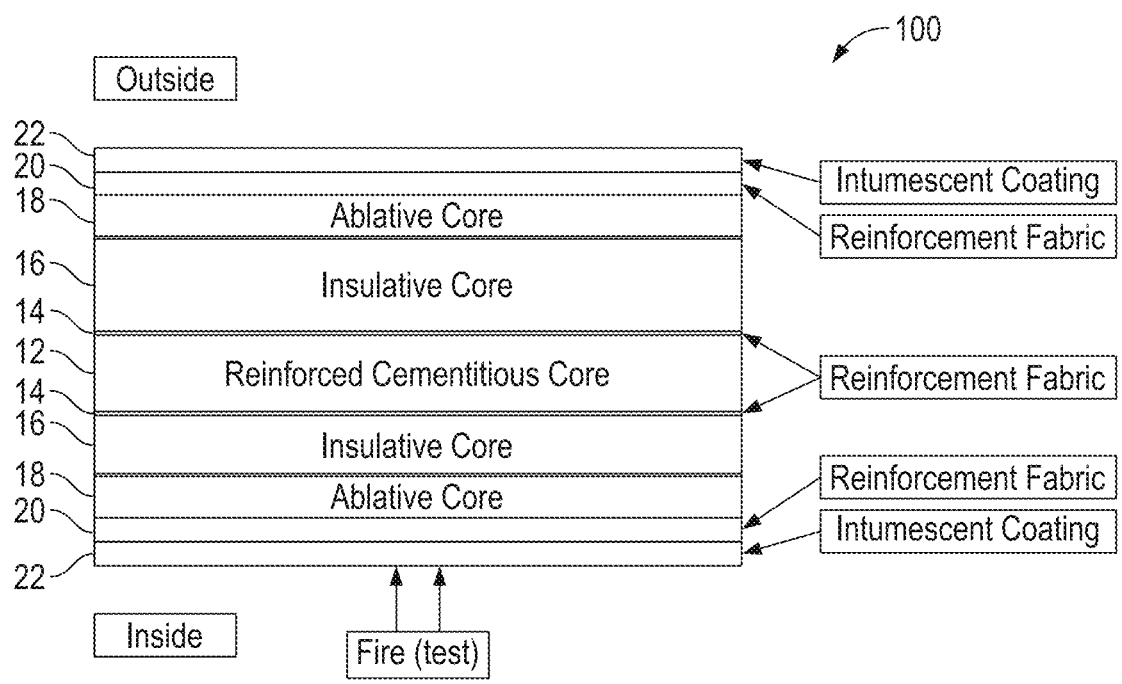
FIG. 2 is a cross-section of an exemplary embodiment of a symmetrical reinforced panel.

Turning now to FIG. 2, a second exemplary embodiment is shown as a bi-directional, fire-resistant panel 100 which is symmetrically layered in construction and comprises a reinforced cementitious innermost core layer 12 having a fiber reinforced resin skin 14 on opposing surfaces thereof. Both sides of the present panel provide fire resistance. A layer of insulative core material 16 is adhered to the resin skin 14 on each side of the central core 12, and a further layer of an ablative core 18 material is adhered to each side of the insulative core 16. An outer fiber reinforcement layer 20 is applied over the ablative core layer 18 on both sides of the panel and thereafter an intumescent coating layer 22 is applied over the outer fiber reinforcement 20. Additionally, decorative primers and coatings, such as paints, can be externally applied to the outer fiber reinforcement layer 20 and/or intumescent coating 22.

The laminated composite panel material 10, 100 is highly structurally stable providing four spaced fiber reinforcement layers 14, 20, two internal layers 14 provided on the innermost cementitious core 12 and two external layers 20 on the outer surfaces.

In a typical fire test, such as an A60 fire test, exposing the fire-resistant side of the panel 10, 100 to a fire source at a temperature of 1750° F., the facing intumescent coating 22, outer fiber reinforcement skin 20, ablative core 18 and insulative core 16 will progressively ablate over the required testing time period of 60 minutes and prevent the surface temperature of the cementitious core 12 from rising above the set testing threshold, preferably 250° F.

Referring to FIGS. 3 through 6 below, there is illustrated and described a further exemplary embodiment of a bidirectional panel 100, along with testing configurations, data, and end result photos of tested materials.

Figure 3:
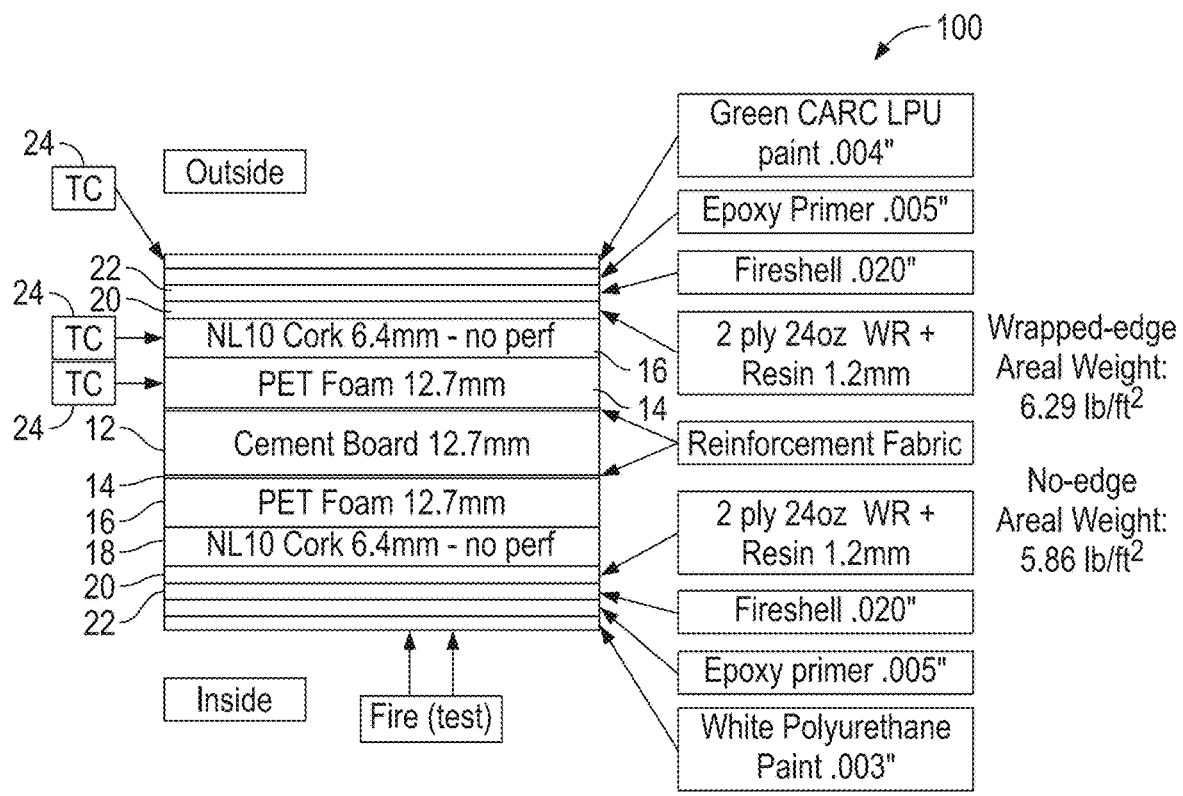
FIG. 3 is a cross-section of a preferred embodiment of a symmetrical reinforced panel.

FIG. 3 below illustrates a preferred structural embodiment including a description of preferential core materials, reinforcement layers and coatings.

Preferably the cementitious core 12 is formed from, but not limited to, Armoroc Megaboard cement board with integrated reinforcement skin layers 14. Insulating core material 16 is preferably, but not limited to, PET foam board. The ablative core material 18 is preferably, but not limited to, CoreCork NL10 Cork board. The outer shell 20 is preferably a layed up composite of 2-plys of Woven Roving reinforcement fabric (WR) and resin. The intumescent coating 22 is preferably, but not limited to, a Fireshell coating or other similar materials. Fiber reinforcing materials can include both glass fiber and carbon fiber as well as other suitable fiber materials such as para-amid synthetic fiber, etc. It should be noted that many different specific materials may be suitable for each of the described layers, with the underlying invention focusing on the combination of ablative layers providing the required fire resistance.

Figure 4:
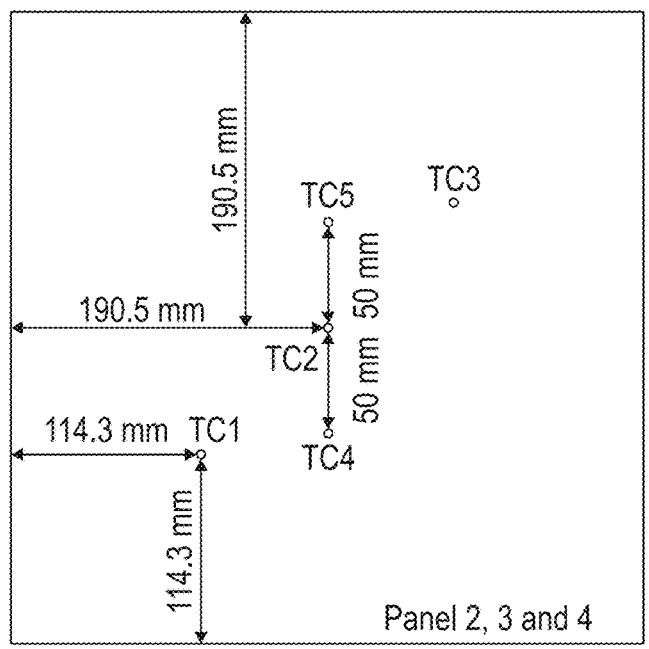
FIG. 4 illustrates thermocouple placement and layout for temperature measurement during testing.

A test panel was prepared with thermocouples 24 positioned as shown in FIGS. 3 and 4. FIG. 3 shows the thermocouple 24 positioning within the layers of panel 100 and FIG. 4 illustrates relative thermocouple placement and layout for temperature measurement during testing.

Figure 5:
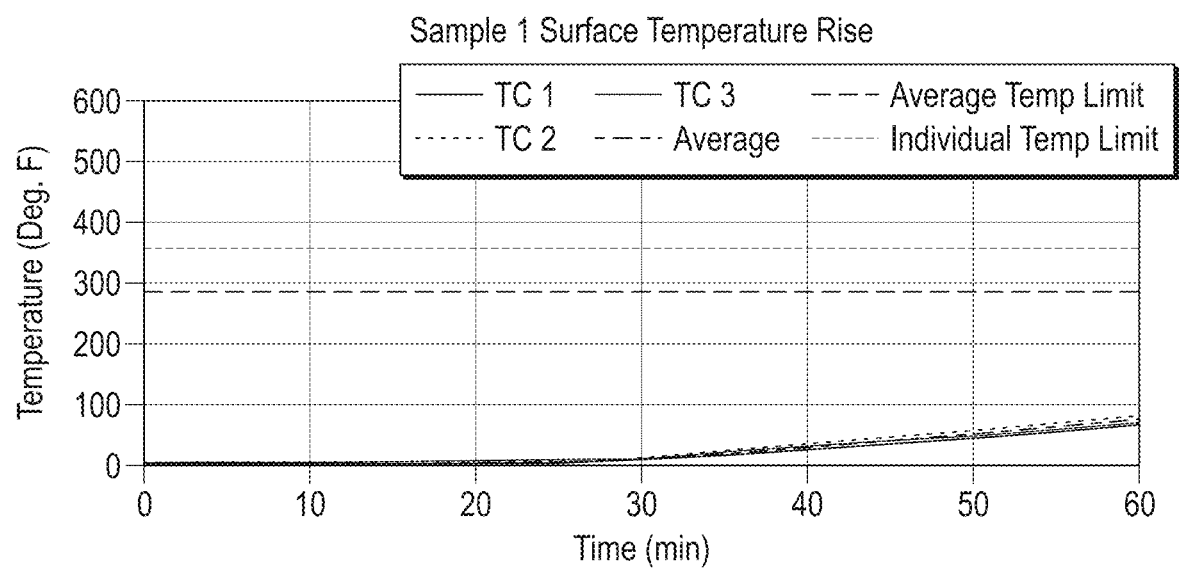
FIG. 5 is a graph showing temperature rise during a panel test.

FIG. 5 provides a graphic illustration of the surface temperature rise during a 60-minute test period where the fire-resistant side of the panel is exposed to a 1750° F. fire source and the internal temperature rise as measured by the thermocouple arrangement is shown to remain well below the required temperature threshold of 250° F.

Figure 6:
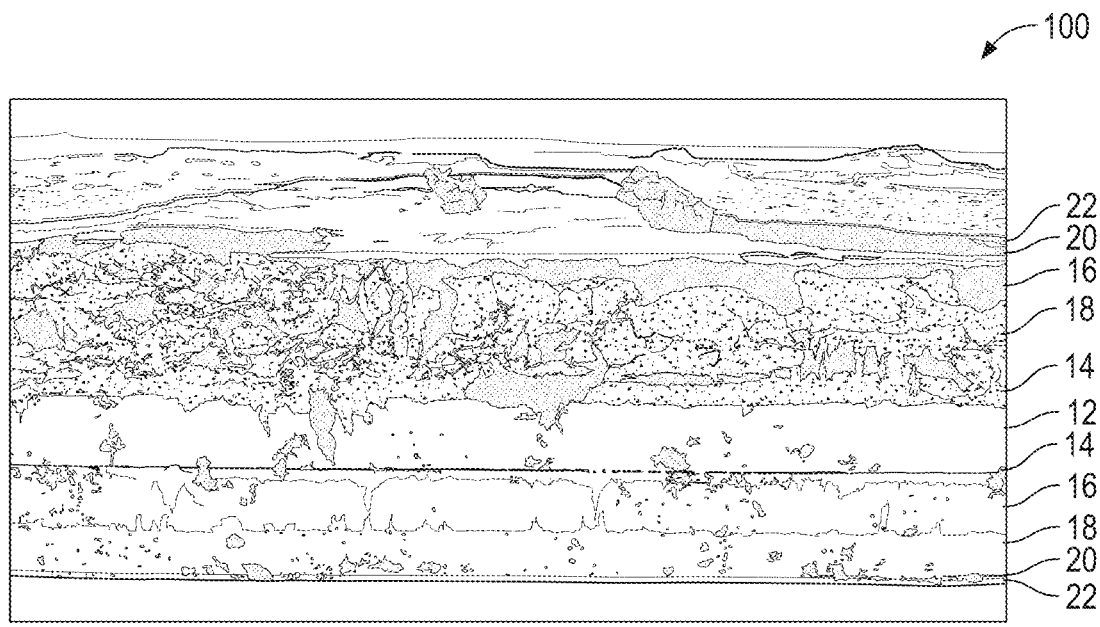
FIG. 6 is an illustration of the layers of a sample panel after fire testing.

Turning now to FIG. 6 there is illustrated a test panel 100 at the end of the 60-minute testing period. It can be seen that the external decorative coatings, intumescent coating, and reinforcement fabric materials have charred and at least partially ablated. It can further be seen that the cork layer 18 has been mostly consumed and the insulating foam layer 16 is almost entirely consumed and has created a void (air gap) between the reinforcing fabric 14 and the external skinned surface 20 of the laminated composite panel 100. More importantly, moving to the opposing side of the panel 100, it can clearly be seen that the structural cement board 12 and reinforcing skin 14 on the opposing side thereof remain intact as well as the opposing foam layer 16, cork layer 18 and external reinforcing fabric 20. These intact structures on the opposing side of the cement board retain rigidity and provide sufficient structural stability and strength to maintain the integrity of the panel even for use as roofing or flooring material with the ability to support a point load of well more than 300 pounds.

Additional embodiments of the invention provide the panels with exemplary joint configurations to allow interlocking of the panels along walls, corners, floors and ceilings. It should be noted that the fiber reinforcement layers must wrap around all exposed edges and the joint configurations and may be additionally reinforced with structural splines and other core materials. Illustrated in FIGS. 7-10 is an exemplary tongue and groove wall panel joint in accordance with the disclosure.

Figure 7:
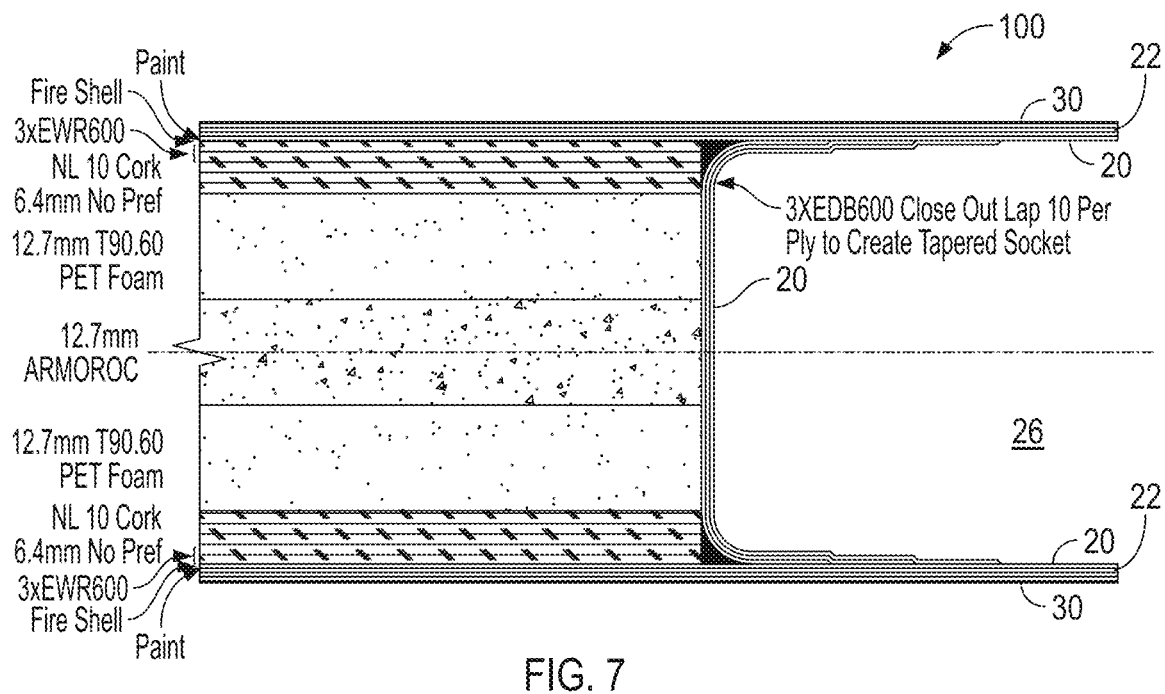
FIGS. 7-9 illustrate an exemplary tongue and groove wall panel joint in accordance with the disclosure.
Figure 8:
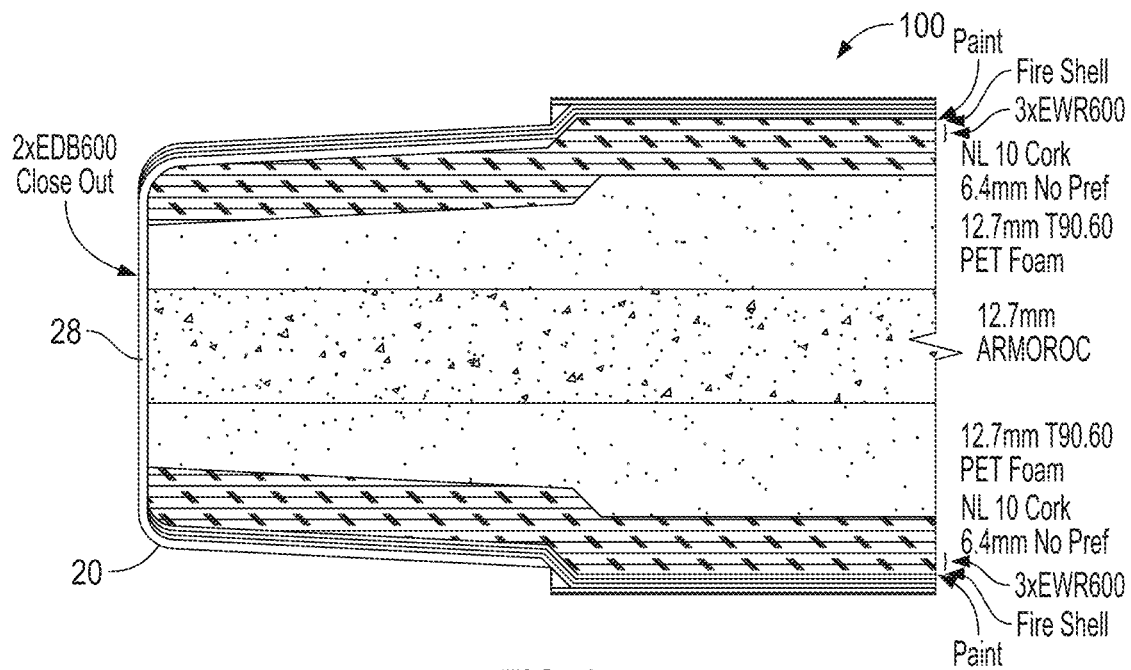
Figure 9:
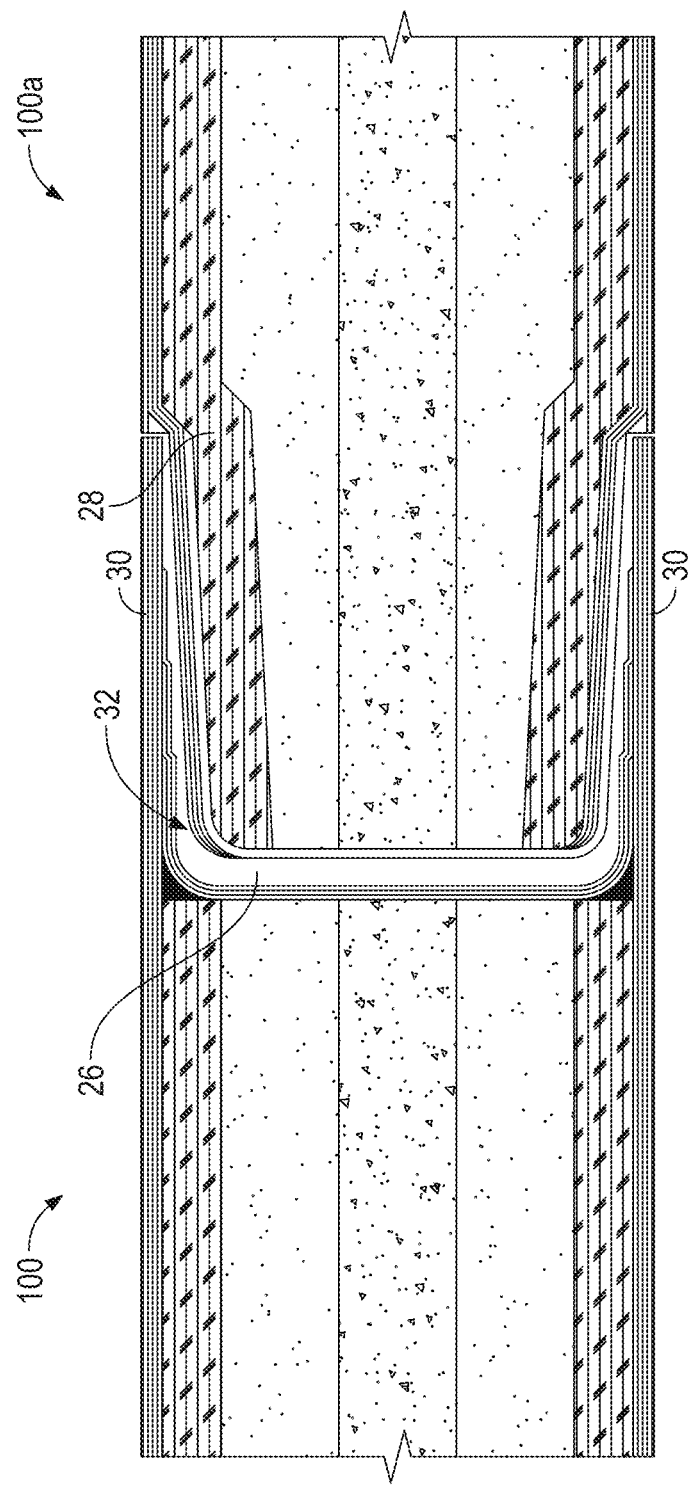

FIG. 7 depicts a mortise fitting 26 where the outer fiber reinforcing layer 20 and ablative coating 22 extend outwardly to form walls 30. It should be noted that the interior of the socket 26 has a layer of outer fiber reinforcing on the interior thereof. A corresponding edge of an adjacent panel 100a includes a narrowed tenon edge 28 that is received interfittingly into the mortise 26 on panel 100 as shown at FIG. 9. When completing the assembly of panel 100 to panel 100a a fire stop gasket 32 may be installed to seal the space in the mortise and tenon edge joint between panels 100, 100a. This facilitates the formation of a sealed fire-resistant wall using a plurality of the panels of the present disclosure.

Figure 10:
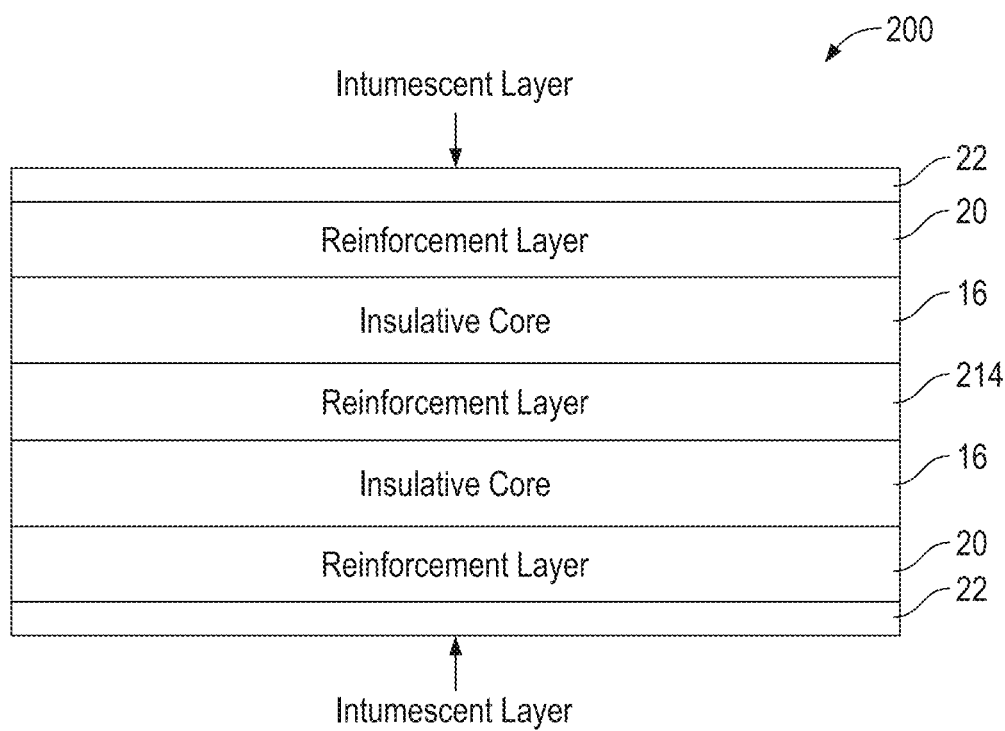
FIG. 10 is a cross-section of another exemplary embodiment of a light-weight reinforced panel.

FIG. 10 depicts an illustrative embodiment of a lightweight fire resistant panel 200 which is symmetrically layered in construction and comprises a central fiber reinforced inner core 114 in place of the reinforced cementitious innermost core layer described in the previous embodiments. Both sides of the present panel provide fire resistance. A layer of insulative core material 16 is adhered to the fiber reinforced core 114 on each side of the central core 114. An outer fiber reinforcement layer 20 is applied over the insulative core layer 16 on both sides of the panel and thereafter an intumescent coating layer 22 is applied over the outer fiber reinforcement 20. Additionally, decorative primers and coatings, such as paints, can be externally applied to the outer fiber reinforcement layer 20 and/or intumescent coating 22.

While there is shown and described herein certain specific structures representing various embodiments of the invention, it will be manifest to those skilled in the art that various modifications and rearrangements of the parts may be made without departing from the spirit and scope of the underlying inventive concept, and that the same is not limited to the particular forms herein shown and described except insofar as indicated by the scope of the appended claims.

What is claimed:

1. A fire-resistant panel comprising:
 a central structural core having an inside face and an outside face;
 a first inner reinforcement layer adjacent said inside face of said structural core and a first outer reinforcement layer adjacent said outside face of said structural core;
 an inner insulative layer adjacent said first inner reinforcement layer and an outer insulative layer adjacent said first outer reinforcement layer;
 an inner ablative core layer adjacent said first inner insulative layer; and
 a second inner reinforcement layer adjacent said inner ablative core layer and a second outer reinforcement layer adjacent said outer insulative layer.

2. The fire-resistant panel of claim 1, further comprising:
 an outer intumescent coating applied to said second outer reinforcement layer and an inner intumescent coating applied to said second inner reinforcement layer.

3. The fire-resistant panel of claim 1, further comprising:
 an outer ablative core layer adjacent said inner insulative layer.

4. The fire-resistant panel of claim 3, further comprising:
 an outer intumescent coating applied to said second outer reinforcement layer and an inner intumescent coating applied to said second inner reinforcement layer.

5. The fire-resistant panel of claim 3, wherein an internal temperature of said panel does not exceed 250° F. after said inside and outside faces are exposed to a 1750° F. heat source for 60 minutes.

6. The fire-resistant panel of claim 3, wherein said outer ablative core layer is cork.

7. The fire-resistant panel of claim 1, wherein said central structural core is a cementitious material.

8. The fire-resistant panel of claim 7, wherein said central structural core is a cement board with said first inner and outer reinforcement layers being integrated therewith.

9. The fire-resistant panel of claim 1, wherein said inner and outer insulative layers are PET foam board.

10. The fire-resistant panel of claim 1, wherein said inner ablative core layer is cork.

11. The fire-resistant panel of claim 1, wherein said first and second, inner and outer reinforcement layers are formed from reinforcing fabric and resin.

12. The fire-resistant panel of claim 11, wherein said reinforcing fabric is selected from the group consisting of: glass fiber, carbon fiber and para-amid synthetic fiber.

13. The fire-resistant panel of claim 1, wherein an internal temperature of said panel does not exceed 250° F. after said inside face is exposed to a 1750° F. heat source for 60 minutes.

14. The fire-resistant panel of claim 1, said panel having a rectangular shape with at least two opposing edges, wherein one of said edges has a mortise joint formed therein and said opposing edge has a corresponding tenon formed therein.

15. A fire-resistant panel comprising:
- a central reinforcement layer having an inside face and an outside face, said central reinforcement layer being formed from a reinforcing fabric and resin;
- an inner foam insulative layer adjacent said inside face of said central reinforcement layer and an outer foam insulative layer adjacent said outside face of said central reinforcement layer, wherein said inner and outer insulative layers are PET foam board;
- an outer reinforcement layer adjacent said outer foam insulative layer, and an inner reinforcement layer adjacent said inner foam insulative layer; and
- an outer intumescent coating applied to said outer reinforcement layer and an inner intumescent coating applied to said inner reinforcement layer.

16. The fire-resistant panel of claim 15, wherein said central and inner and outer reinforcement layers are formed from reinforcing fabric and resin.

17. The fire-resistant panel of claim 16, wherein said reinforcing fabric is selected from the group consisting of: glass fiber, carbon fiber and para-amid synthetic fiber.

18. The fire-resistant panel of claim 15, wherein an internal temperature of said panel does not exceed 250° F. after said inside and outside faces are exposed to a 1750° F. heat source for 60 minutes.

19. The fire-resistant panel of claim 15, said panel having a rectangular shape with at least two opposing edges, wherein one of said edges has a mortise joint formed therein and said opposing edge has a corresponding tenon formed therein.

* * * * *